United States Patent [19]
Yasue et al.

[11] Patent Number: 5,842,953
[45] Date of Patent: Dec. 1, 1998

[54] AUTOMOTIVE VEHICLE LOCK-UP CLUTCH CONTROL APPARATUS WHEREIN CHANGE OF LINE PRESSURE FOR LOCK-UP CLUTCH SLIP CONTROL VALVE IS RESTRICTED DURING SLIP CONTROL MODE

[75] Inventors: Hideki Yasue, Toyota; Hiromichi Kimura, Okazaki, both of Japan

[73] Assignee: Toyota Jidosha Kabushiki Kaisha, Toyota, Japan

[21] Appl. No.: 882,391

[22] Filed: Jul. 10, 1997

[30] Foreign Application Priority Data

Jul. 10, 1996 [JP] Japan .................................. 8-180525

[51] Int. Cl.$^6$ ............................. F16H 61/00; F16H 61/14
[52] U.S. Cl. .......................... 477/174; 477/176; 477/158
[58] Field of Search ..................................... 477/166, 174, 477/175, 176, 156, 158

[56] References Cited

U.S. PATENT DOCUMENTS

| | | | |
|---|---|---|---|
| 5,085,301 | 2/1992 | Inamura et al. | 477/176 X |
| 5,111,718 | 5/1992 | Iizuka | 477/158 |
| 5,113,719 | 5/1992 | Suzuki et al. | 477/158 X |
| 5,588,937 | 12/1996 | Kono et al. | 477/176 X |
| 5,611,752 | 3/1997 | Kamada et al. | 477/174 X |

FOREIGN PATENT DOCUMENTS 64-87964  4/1989  Japan .

*Primary Examiner*—Khoi Q. Ta
*Attorney, Agent, or Firm*—Oblon, Spivak, McClelland, Maier & Neustadt, P.C.

[57] ABSTRACT

Apparatus for controlling the amount of slip of a lock-up clutch of an automotive vehicle, which is provided in a fluid-operated power transmitting device such as a torque converter disposed between an engine and an automatic transmission, for direct connection of the engine and the automatic transmission, the apparatus including a pressure regulating valve for regulating a line pressure depending upon a load of the engine, a lock-up clutch slip control valve operable in a slip control mode for receiving the regulated line pressure and regulating a hydraulic pressure applied to the lock-up clutch to control the amount of slip of the lock-up clutch, a slip control mode detecting device for detecting an operation of the lock-up clutch slip control valve in the slip control mode, and a line pressure change restricting device for restricting an operation of the pressure regulating valve to restrict a change of the line pressure with a change in the engine during operation of the lock-up clutch slip control valve in the slip control mode.

7 Claims, 11 Drawing Sheets

FIG. 2

| SHIFT LEVER | TRANSMISSION POSITIONS | $C_1$ | $C_2$ | $C_3$ | $B_1$ | $B_2$ | $B_3$ | $F_1$ | $F_2$ |
|---|---|---|---|---|---|---|---|---|---|
| P | | | | | | | ○ | | |
| R | | | ○ | | | ○ | ○ | | |
| N | | | | | | | ○ | | |
| D | 1st | ○ | | | | | ○ | △ | △ |
| D | 2nd | ○ | | | ○ | | ○ | | △ |
| D | 3rd | ○ | ○ | | | | ○ | | △ |
| D | 4th | ○ | ○ | ○ | | | | | |
| 2 | 1st | ○ | | | | | ○ | △ | △ |
| 2 | 2nd | ○ | | | ○ | | ○ | | △ |
| L | 1st | ○ | | | | ○ | ○ | △ | △ | de
AUTOMOTIVE VEHICLE LOCK-UP CLUTCH CONTROL APPARATUS WHEREIN CHANGE OF LINE PRESSURE FOR LOCK-UP CLUTCH SLIP CONTROL VALVE IS RESTRICTED DURING SLIP CONTROL MODE

This application is based on Japanese Patent Application No. 8-180525 filed Jul. 10, 1997, the content of which is incorporated hereinto by reference.

BACKGROUND OF THE INVENTION

1. Field of the Invention

The present invention relates to an apparatus for controlling the amount of slip of a lock-up clutch provided on an automotive vehicle.

2. Discussion of the Related Art

In the field of a power transmitting system of an automotive vehicle, there is known a lock-up clutch control apparatus for controlling the amount of slip of a lock-up clutch, which is provided in a power transmitting device such as a torque converter disposed between an engine and an automatic transmission, for direct connection of the engine and the automatic transmission. The lock-up clutch control apparatus includes a pressure regulating valve for regulating a line pressure depending upon a load acting on the engine, and a lock-up clutch slip control valve which receives the line pressure regulated by the pressure regulating valve and which regulates a hydraulic pressure applied to the lock-up clutch for controlling the amount of slip of the lock-up clutch. An example of such a lock-up clutch control apparatus is disclosed in JP-A-64-87964.

In the known lock-up clutch control apparatus described above, the lock-up clutch slip control valve is operated to regulate the hydraulic pressure applied to the lock-up clutch for controlling the amount of slip of the lock-up clutch, when the vehicle running condition falls in a predetermined slip control area, that is, when the control apparatus is placed in a slip control mode. The lock-up clutch slip control valve regulates the hydraulic pressure in the slip control mode so that the actual amount of slip of the lock-up clutch coincides with a predetermined target value. With the slip of the lock-up clutch thus controlled, a booming noise due to a variation of the engine torque and a vibration of the vehicle are reduced. The lowest vehicle running speed at which the lock-up clutch can be held partially engaged in the slip control mode is lower than that at which the lock-up clutch can be held fully engaged in a fully engaging mode. Accordingly, the slip control mode permits higher fuel economy of the vehicle while assuring quiet running of the vehicle, than the fully engaging mode.

The lock-up clutch slip control valve is adapted to receive the line pressure which is regulated by the pressure regulating valve depending upon the engine load. Accordingly, a change in the engine load in the slip control mode affects the hydraulic pressure which is controlled by the lock-up clutch slip control valve and which is applied to the lock-up clutch. In the conventional lock-up clutch control apparatus, therefore, the accuracy of controlling the actual amount of slip of the lock-up clutch so as to achieve the target value is not sufficiently high in the vehicle running condition in which the engine load tends to vary.

SUMMARY OF THE INVENTION

It is therefore an object of the present invention to provide an automotive vehicle lock-up clutch control apparatus which assures a sufficiently high degree of control accuracy of the amount of slip of the lock-up clutch in the slip control mode, irrespective of a change in the engine load during operation of the lock-up clutch slip control valve in the slip control mode.

The above object may be achieved according to the principle of this invention, which provides an apparatus for controlling the amount of slip of a lock-up clutch which is provided in a fluid-operated power transmitting device disposed between an engine and an automatic transmission of an automotive vehicle, for direct connection of the engine and the automatic transmission, the apparatus comprising: (a) a pressure regulating valve for regulating a line pressure depending upon a load acting on the engine; (b) a lock-up clutch slip control valve operable in a slip control mode, for receiving the line pressure regulated by the pressure regulating valve, and regulating a hydraulic pressure applied to the lock-up clutch to control the amount of slip of the lock-up clutch; (c) slip control mode detecting means for detecting an operation of the lock-up clutch slip control valve in the slip control mode; and (d) line pressure change restricting means, responsive to the slip control mode detecting means, for restricting an operation of the pressure regulating valve to restrict a change of the line pressure with a change in the load of the engine, while the lock-up clutch slip control valve is operated in the slip control mode.

In the lock-up clutch control apparatus of the present invention constructed as described above, the change of the line pressure by the pressure regulating valve as a result of a change in the engine load is restricted by the line pressure change restricting means if the slip control mode detecting means detects the operation of the lock-up clutch slip control valve in the slip control mode, that is, while the lock-up clutch slip control valve is operated in the slip control mode. Accordingly, the hydraulic pressure applied to the lock-up clutch during operation of the lock-up clutch slip control valve in the slip control mode is less likely to be affected by the change in the engine load. Therefore, the present lock-up clutch control apparatus assures a sufficiently high degree of control accuracy of the actual amount of slip of the lock-up clutch in the slip control mode, irrespective of a change in the engine load during operation of the lock-up clutch slip control valve in the slip control mode.

BRIEF DESCRIPTION OF THE DRAWINGS

The above and other objects, features advantages and technical and industrial significance of this invention will be better understood by reading the following detailed description of a presently preferred embodiment of the invention, when considered in connection with the accompanying drawings, in which:

FIG. 2 is a view indicating combinations of operating states of clutches and brakes for establishing respective operating positions of the automatic transmission of FIG. 1;

DETAILED DESCRIPTION OF THE PREFERRED EMBODIMENT

Figure 1:
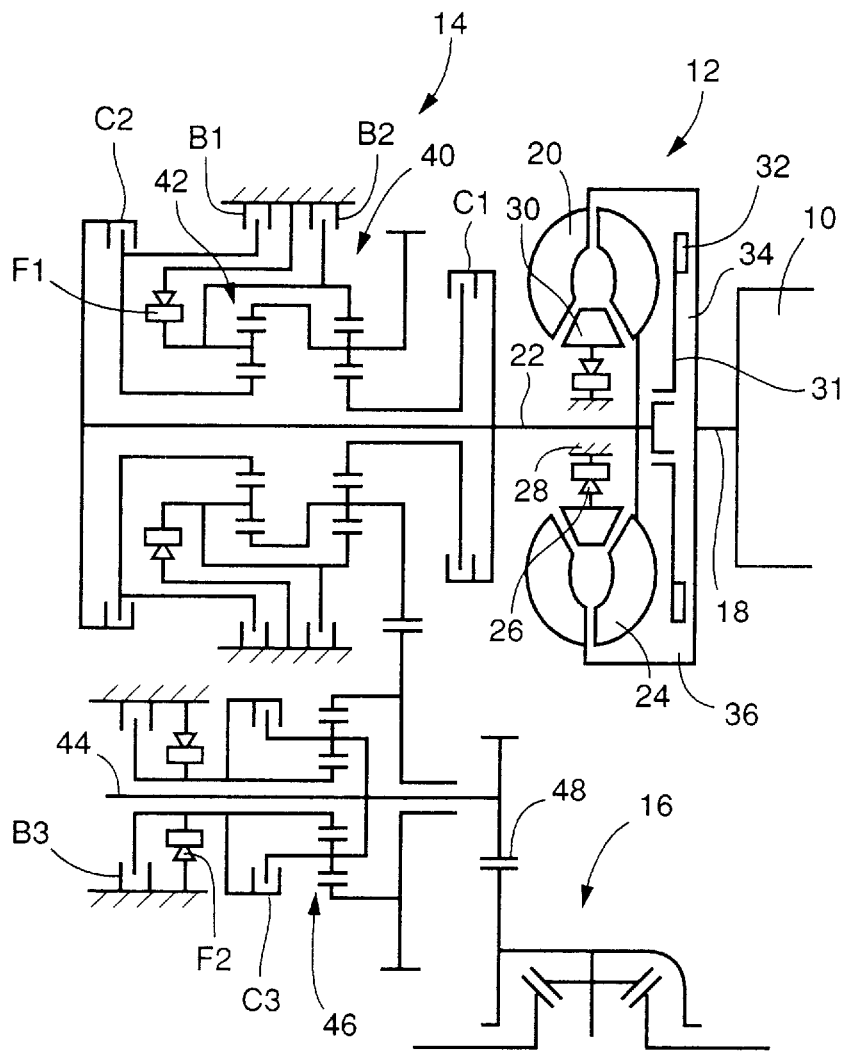
FIG. 1 is a schematic view showing a power transmitting system of an automotive vehicle including an automatic transmission to which the present invention is applicable.

Referring first to FIG. 1, there is shown a power transmitting system of an automotive vehicle, wherein an output of an engine 10 is transmitted to drive wheels of the vehicle through a fluid-operated power transmitting device in the form of a torque converter 12, an automatic transmission 14, and a differential gear device 16. The torque converter 12 includes a pump impeller 20 connected to a crankshaft 18 of the engine 10, a turbine impeller 24 connected to an input shaft 22 of the automatic transmission 14, a stator impeller 30 fixed through a one-way clutch 26 to a stationary member in the form of a housing 28, and a lock-up clutch 32 connected to the input shaft 22 through an axially movable piston 31 and a suitable damper (not shown).

The piston 31 of the lock-up clutch 32 divides the interior of the torque converter 12 into a releasing oil chamber 34 and an engaging oil chamber 36. When a hydraulic pressure in the releasing oil chamber 34 is higher than that in the engaging oil chamber 36, the lock-up clutch 32 is released. When the pressure in the engaging oil chamber 36 is higher than that in the releasing oil chamber 34, the lock-up clutch 32 is engaged.

The automatic transmission 14 includes: two single-pinion type planetary gear sets 40, 42 disposed coaxially with the input shaft 22; a planetary gear set 46 disposed coaxially with a counter shaft 44 which is parallel to the input shaft 22; and an output gear 48 which is fixed to an end of the counter shaft 44 and which meshes with the differential gear device 16. Elements of the planetary gear sets 40, 42, 46 are selectively connected to each other by selective engagement of three clutches C1, C2, C3, and are selectively fixedly connected to the housing 28 by selective engagement of three brakes B1, B2, B3. Further, the elements of the planetary gear sets 40, 42, 46 are selectively connected to each other or fixedly connected to the housing 28, through two one-way clutches F1, F2, depending upon the directions of rotation of those elements. Since the differential gear device 16 is symmetrical with respect to its axis (drive axle of the vehicle), only a half (an upper half) of the device 16 is shown in FIG. 1.

The clutches C1, C2, C3 and brakes B1, B2, B3 (which will be generally referred to as "clutches C and brakes B", where appropriate) are hydraulically operated frictional coupling devices such as multiple-disc clutches or band-brakes, which are engaged by suitable hydraulic actuators. The automatic transmission 14 has four forward-drive positions "1st", "2nd", "3rd" and "4th", as indicated in FIG. 2. With the clutches C and brakes B selectively engaged by the respective hydraulic actuators, a selected one of the four forward-drive positions of the automatic transmission 14 is established. In FIG. 2, "o" represents engaged states of the clutches C and brakes B, and "Δ" represents engaged states of the one-way clutches F1, F2 only when a drive torque is transmitted in the forward direction from the engine 10 toward the drive wheels. The one-way clutches F1, F2 are not engaged when the appropriate operating positions of the automatic transmission 14 are established with an engine brake being applied to the vehicle. It will also be noted that the absence of the symbols "o" and "W" indicates released states of the clutches C, brakes B and one-way clutches F1, F2.

Figure 3:
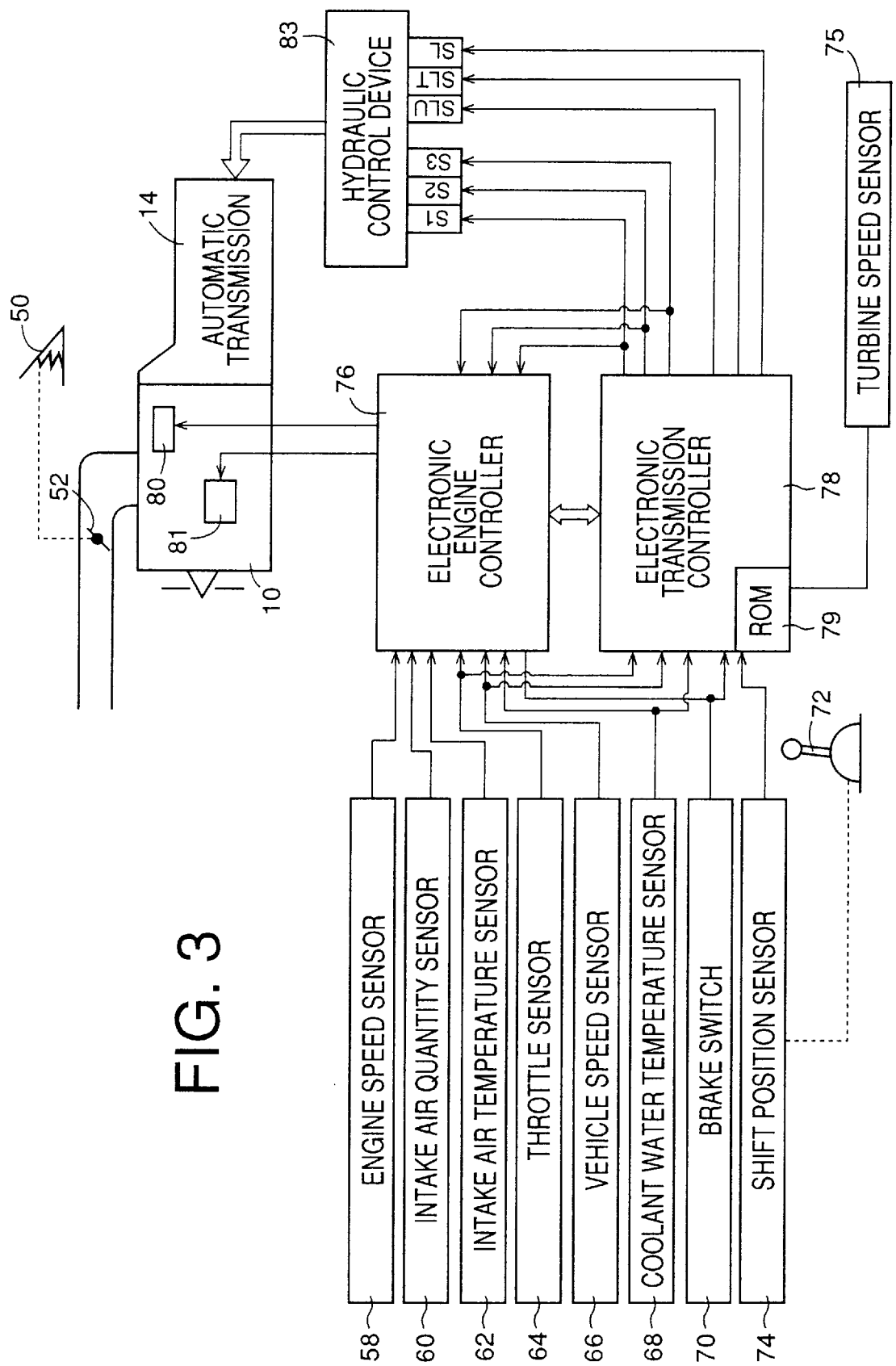
FIG. 3 is a block diagram illustrating a control system including an electronic transmission controller for controlling the automatic transmission of FIG. 1 and a lock-up clutch operatively connected to the automatic transmission.

The engine 10 and the automatic transmission 14 are controlled by a control system shown in FIG. 3, wherein a throttle valve 52 is disposed in an intake pipe of the engine 10. The throttle valve 52 is operatively linked with an accelerator pedal 50. The control system includes an electronic engine controller 76 and an electronic transmission controller 78 which are connected to each other. The engine controller 76 is adapted to receive output signals of an engine speed sensor 58, an intake air quantity sensor 60, an intake air temperature sensor 62, a throttle sensor 64, a vehicle speed sensor 66, a coolant water temperature sensor 68 and a BRAKE switch 70, while the transmission controller 78 is adapted to receive the output signals of the sensors 64, 66, 68 and BRAKE switch 70, and an output signal of a shift position sensor 74. The output signal of the engine speed sensor 58 represents a speed $N_E$ of the engine 10. The output signal of the intake air quantity sensor 70 represents an intake air quantity Q of the engine 10. The output signal of the intake air temperature sensor 62 represents a temperature $T_A$ of the intake air of the engine 10. The output signal of the throttle valve 52 represents an opening angle θ of the throttle valve 52. The output signal of the vehicle speed sensor 66 represents a rotating speed $N_{OUT}$ of the counter shaft 44, which can be used to calculate a running speed V of the motor vehicle. The output signal of the coolant water temperature sensor 68 represents a temperature $T_W$ of a coolant water of the engine 10. The output signal of the BRAKE switch 70 indicates an operating state of a brake pedal (not shown). The output signal of the shift position sensor 74 represents a currently selected or established position $P_{sh}$ of a shift lever 72. The transmission controller 78 also receives an output signal of a turbine speed sensor 75 representative of a rotating speed $N_T$ of the turbine impeller 24, that is, a rotating speed $N_{IN}$ of the input shaft 22 of the automatic transmission 14. The speed $N_{IN}$ will be referred to as "input speed of the automatic transmission 14" where appropriate.

The engine controller 76 is a so-called microcomputer incorporating a central processing unit (CPU), a random-access memory (RAM), a read-only memory (ROM), and an input and output interface. The CPU of the engine controller 76 operates according to control programs stored in the ROM while utilizing a temporary data storage function of the RAM, to process the received output signals of the sensors indicated above, for effecting various control operations to control the engine 10, such as an operation to control a fuel injector valve 80 for controlling an amount of injection of a fuel, an operation to control an ignitor 81 for controlling the ignition timing of the engine 10, and an operation to control a well-known by-pass valve for controlling an idling speed of the engine 10.

The transmission controller 78 is also a microcomputer similar to that of the engine controller 76. A CPU of the microcomputer of the transmission controller 78 is also adapted to operate according to control programs stored in a ROM 79 while utilizing a temporary data storage function of a RAM, to process the received output signals of the sensors, for controlling various solenoid-operated valves S1, S2, S3, SL and linear solenoid valves SLU, SLT used in a hydraulic control device 83 for the automatic transmission 14. For instance, the transmission controller 78 controls the linear solenoid valve SLT so as to generate an output pressure $P_{SLT}$ corresponding to the opening angle $\theta$ of the throttle valve 52, controls the linear solenoid valve SLU so as to control an amount of slip $N_{SLIP}$ ($=N_E-N_T$) of the lock-up clutch 32, and controls the solenoid-operated valve SL for selectively engaging and releasing the lock-up clutch 32. The transmission controller 78 is further adapted to determine whether the automatic transmission 14 should be shifted up or down from the currently established position to another position, on the basis of the detected opening angle $\theta$ of the throttle valve 52 and the running speed V of the vehicle, and according to predetermined shift patterns, and whether the lock-up clutch 32 should be engaged or released. According to results of these determinations, the transmission controller 78 controls the solenoid-operated valves S1, S2, S3 so as to shift the automatic transmission 14 and controls the operating state of the lock-up clutch 32.

Figure 4:
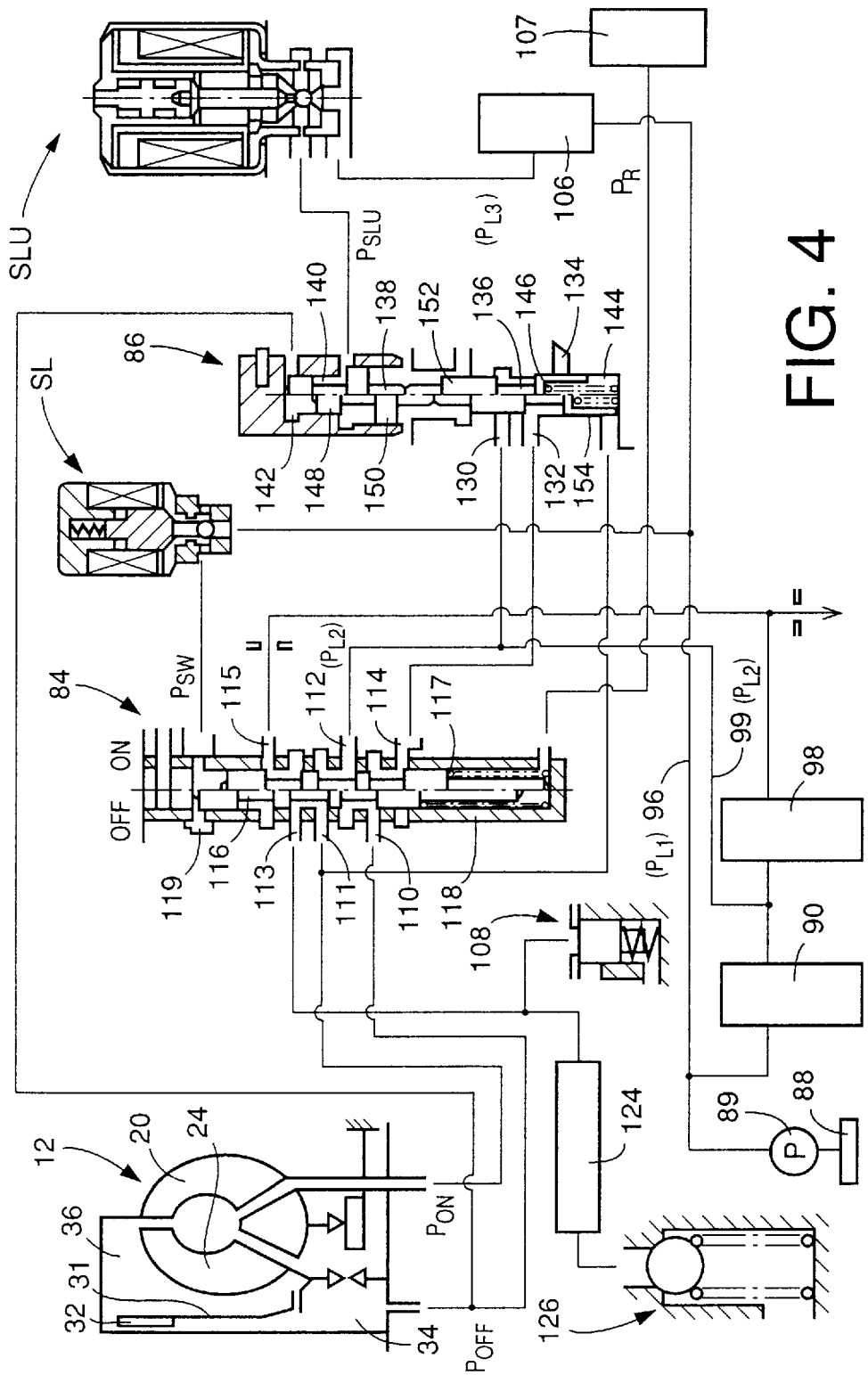
FIG. 4 is a view illustrating a part of a hydraulic control device shown in FIG. 3, which incorporates a circuit for controlling the amount of slip of the lock-up clutch.

Referring to FIG. 4, there is shown a part of a hydraulic pressure control circuit 82 incorporated in the hydraulic control device 83 shown in FIG. 3. The hydraulic control circuit 82 includes a lock-up clutch control circuit for controlling the lock-up clutch 32. The lock-up clutch control circuit includes the above-indicated solenoid-operated valve SL, a lock-up relay valve 84, the above-indicated linear solenoid valve SLU, and a lock-up clutch slip control valve 86. The solenoid-operated valve SL is energized and deenergized by the transmission controller 78. When the valve SL is energized, a LOCK-UP SWITCHING pilot pressure $P_{SW}$ is generated from the valve SL. The lock-up relay valve 84 functions as a lock-up clutch switching valve having a releasing state and an engaging state for releasing and engaging the lock-up clutch 32, respectively, depending upon whether the pilot pressure $P_{SW}$ is generated from the solenoid-operated valve SL. In the releasing state, a second line pressure $P_{L2}$ is applied to the releasing oil chamber 34 to release the lock-up clutch 32. In the engaging state, the second line pressure $P_{L2}$ is applied to the engaging oil chamber 36 to engage the lock-up clutch 32. The linear solenoid valve SLU is adapted to generate a SLIP CONTROL pilot pressure $P_{SLU}$ corresponding to a SLIP CONTROL current $I_{SLU}$ supplied from the transmission controller 78. The lock-up clutch slip control valve 86 is adapted to regulate a pressure difference $\Delta P$ between the hydraulic pressures in the releasing and engaging oil chambers 34, 36 of the torque converter 12, according to the SLIP CONTROL pilot pressure $P_{SLU}$ received from the linear solenoid valve SLU, for thereby controlling the amount of slip $N_{SLIP}$ of the lock-up clutch 32.

Figure 5:
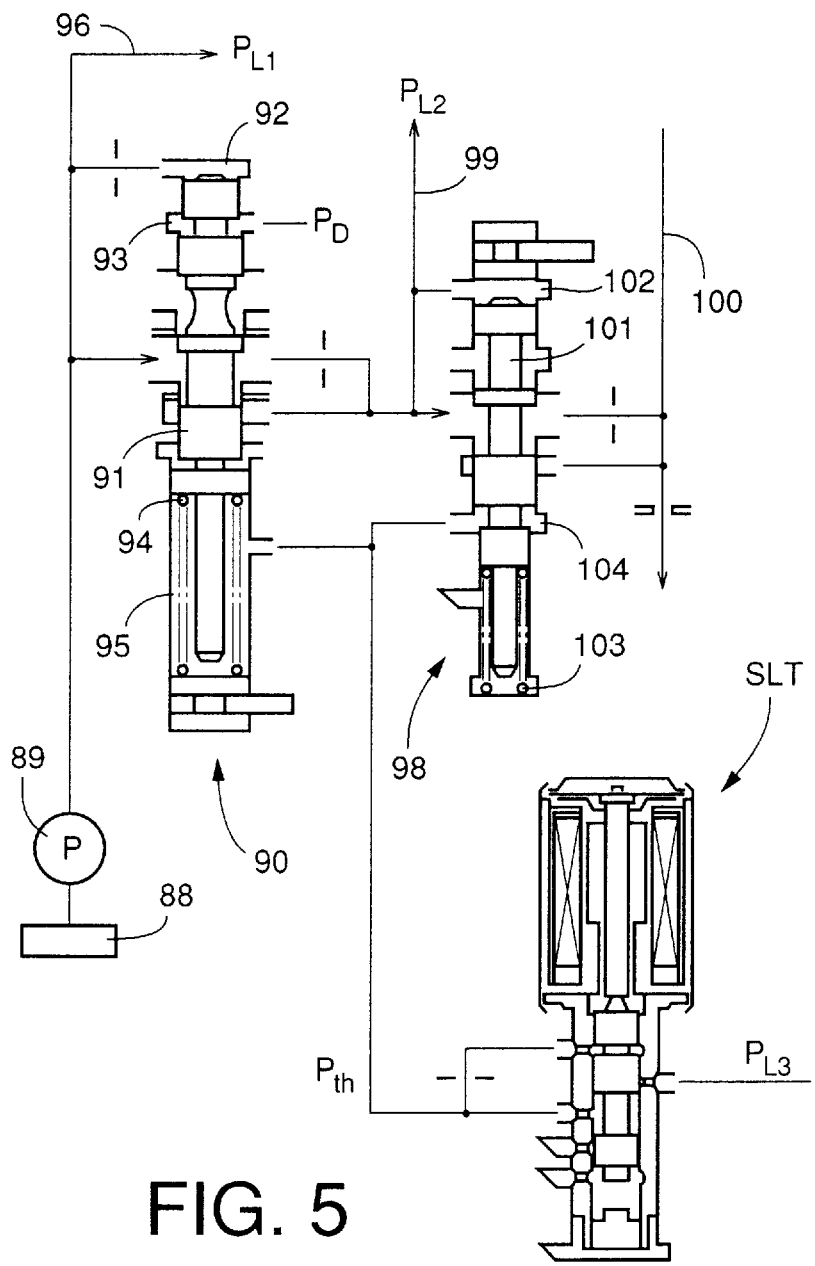
FIG. 5 is a view showing a lock-up clutch control valve provided in the circuit of FIG. 4 for controlling the lock-up clutch, and pressure regulating valves for regulating a hydraulic pressure applied to the lock-up clutch.

As shown in FIG. 4, the hydraulic control device 83 includes a pump 89 for pressurizing a working oil sucked from a suitable oil reservoir through a strainer 88. The pump 89 is driven by the engine 10. The pressure of the oil delivered by the pump 89 is adjusted to a first line pressure $P_{L1}$ by a first pressure regulating valve 90 of an overflow type. As shown in FIG. 5, the first pressure regulating valve 90 has: a spool 91 for adjusting an amount of the oil which is received from the pump 89 and which is discharged from the valve 90 into a second pressure line 99; a feedback oil chamber 92 which receives the first line pressure $P_{L1}$ as the feedback pressure biasing the spool 91 in a valve opening direction; an oil chamber 93 which receives a FORWARD-DRIVE pressure $P_D$ biasing the spool 91 in the valve opening direction; a spring 94 for biasing the spool 91 in a valve closing direction; and an oil chamber 95 which accommodates the spring 94 and receives from the linear solenoid valve SLT a THROTTLE pilot pressure $P_{th}$ which corresponds to the throttle opening angle $\theta$ and which biases the spool 91 in the valve closing direction. The first pressure regulating valve 90 regulates the first line pressure $P_{L1}$ in a first pressure line 96, such that the first line pressure $P_{L1}$ changes with the throttle opening angle $\theta$ (indicative of a load acting on the engine 10), and is lower by a predetermined amount when the shift lever 72 is placed in a forward-drive position "D" in which the automatic transmission 14 is automatically shifted to a selected one of the forward-drive positions "1st", "2nd", "3rd" and "4th". The FORWARD-DRIVE pressure $P_D$ is generated from a manual valve 107 (which will be described) when the shift lever 72 is placed in the forward-drive position "D".

The hydraulic control device 83 also includes a second pressure regulating valve 98 of an overflow type, which has: a spool 101 for adjusting an amount of the oil which is discharged from the first pressure regulating valve 90 into the second pressure line 99 and which is discharged from the valve 98 into a lubrication line 100; a feedback oil chamber 102 which receives the second line pressure $P_{L2}$ as the feedback pressure biasing the spool 101 in a valve opening direction; a spring 103 for biasing the spool 101 in a valve closing direction; and an oil chamber 104 which accommodates the spring 103 and receives from the linear solenoid valve SLT the THROTTLE pilot pressure $P_{th}$ which corresponds to the throttle opening angle $\theta$ and which biases the spool 101 in the valve closing direction. The second pressure regulating valve 98 regulates the second line pressure $P_{L2}$ in the second pressure line 99, such that the second line pressure $P_{L2}$ changes with the throttle opening angle $\theta$ (indicative of the load acting on the engine 10).

The hydraulic control device 83 further includes a third pressure regulating valve 106 and the above-indicated manual valve 107. The third pressure regulating valve 106 is adapted to reduce the first line pressure $P_{L1}$ into a predetermined third line pressure $P_{L3}$ which is applied to the linear solenoid valves SLU and SLT, as indicated in FIGS. 4 and 5. The manual valve 107 is adapted to generate a REVERSE pressure $P_R$ when the shift lever 72 is placed in a reverse position "R", and the FORWARD-DRIVE position $P_D$ when the shift lever 72 is placed in the forward-drive position "D", as described above with respect to the first pressure regulating valve 90.

The lock-up relay valve 84 has: a releasing port 110 communicating with the releasing oil chamber 34; an engaging port 111 communicating with the engaging oil chamber 36; an input port 112 adapted to receive the second line pressure $P_{L2}$; a first drain port 113 through which the oil in the engaging oil chamber 36 is discharged when the lock-up clutch 32 is released; a second drain port 114 through which the oil in the releasing oil chamber 34 is discharged when the lock-up clutch 32 is engaged; a port 115 through which the oil is supplied to an oil cooler 124 when the lock-up clutch 32 is engaged; a spool 116 operable between an ON position and an OFF position, for switching the mutual communication or connection of the ports indicated above; a spring 117 biasing the spool 116 toward its OFF position; an oil chamber 118 which accommodates the spring 117 and which receives the REVERSE pressure $P_R$ biasing the spool 116 toward its OFF position; and an oil chamber 119 which is partially defined by an end face of the spool 116 and which receives from the solenoid-operated valve SL the LOCK-UP SWITCHING pilot pressure $P_{SW}$ biasing the spool 116 toward its ON position.

When the solenoid-operated valve SL is in the deenergized or OFF state, the pilot pressure $P_{SW}$ is not applied to the oil chamber 119, and the spool 116 is moved to its OFF position under the biasing action of the spring 117, whereby the input port 112 communicates with the releasing port 110 while the first drain port 113 communicates with the engaging port 111. As a result, a hydraulic pressure $P_{off}$ in the releasing oil chamber 34 is made higher than a hydraulic pressure $P_{on}$ in the engaging oil chamber 36, to thereby release the lock-up clutch 32, while at the same time the engaging oil chamber 36 is drained through the first drain port 113, oil cooler 124 and a check valve 126.

In the energized or ON state of the solenoid-operated valve SL, on the other hand, the pilot pressure $P_{SW}$ is applied to the oil chamber 119, and the spool 116 is moved to its ON position against the biasing force of the spring 117, whereby the input port 112 communicates with the engaging port 111 while the first and second drain ports 113, 114 communicate with the port 115 and the releasing port 110, respectively. As a result, the pressure $P_{on}$ in the engaging oil chamber 36 is made higher than the pressure $P_{off}$ in the releasing oil chamber 34, to thereby engage the lock-up clutch 32, while at the same time the releasing oil chamber 34 is drained through the second drain port 114 and the lock-up clutch slip control valve 86.

Figure 6:
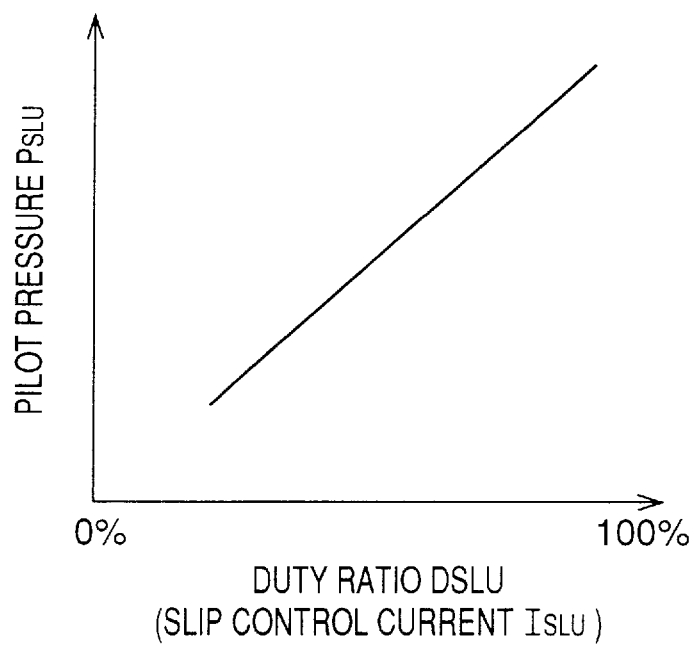
FIG. 6 is a graph indicating an output characteristic of a linear solenoid valve SLU provided in the circuit of FIG. 4.

The linear solenoid valve SLU is a pressure reducing valve adapted to reduce the predetermined third line pressure $P_{L3}$ generated by the third pressure regulating valve 106, to the SLIP CONTROL pilot pressure $P_{SLU}$, such that the pilot pressure $P_{SLU}$ increases with an increase in the SLIP CONTROL current $I_{SLU}$ supplied from the transmission controller 78, namely, increases with an increase in a duty ratio $D_{SLU}$ of the linear solenoid valve SLU, as indicated in the graph of FIG. 6. The thus controlled pilot pressure $P_{SLU}$ is applied to the lock-up clutch slip control valve 86.

The lock-up clutch slip control valve 86 has: a line pressure port 130 adapted to receive the second line pressure $P_{L2}$; an input port 132 adapted to receive the oil discharged from the releasing oil chamber 34 through the second drain port 114 of the lock-up relay valve 84; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; a pilot pressure oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the hydraulic pressure $P_{off}$ in the releasing oil chamber 34, for biasing the plunger 138 so as to generate a thrust force which biases the spool 136 toward the first position; and an oil chamber 144 adapted to receive the hydraulic pressure $P_{on}$ in the engaging oil chamber 36, for generating a thrust force for biasing the spool 136 toward the second position; and a spring 146 accommodated in the oil chamber 144, for biasing the spool 136 toward the second position. In the first position of the spool 136 of the lock-up clutch slip control valve 86, the input port 132 communicates with the drain port 134 to cause the releasing oil chamber 34 to be drained, for thereby increasing the pressure difference ΔP ($=P_{on}-P_{off}$) of the oil chambers 34, 36. In the second position of the spool 136, the input port 132 communicates with the line pressure port 130 to cause the second line pressure $P_{L2}$ to be applied to the releasing oil chamber 34, for thereby reducing the pressure difference ΔP.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional A3. In this arrangement of the lock-up clutch slip control valve 86, the plunger 138 and the spool 136 are moved together as a unit with the plunger 138 held in abutting contact with the spool 136. With the movement of the spool 136 and the plunger 138, the pressure difference $\Delta P=P_{on}-P_{off}$ on the opposite sides of the piston 31 of the lock-up clutch 32 is controlled depending upon the SLIP CONTROL pilot pressure $P_{SLU}$ generated by the linear solenoid valve SLU. Where the cross sectional area A1 is equal to the cross sectional area A3, the pressure difference ΔP changes with the pilot pressure $P_{SLU}$, according to the following equation:

$$\Delta P=[(A2-A1)/A1] \times P_{SLU} -Fs/A1$$

where, Fs: biasing force of the spring 146

Figure 7:
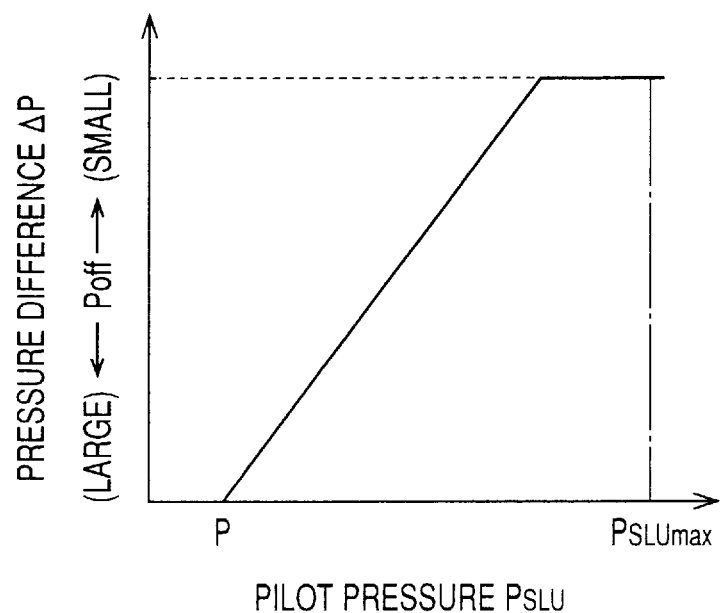
FIG. 7 is a graph indicating an output characteristic of the lock-up clutch control valve, namely, a relationship between a pilot pressure $P_{SLU}$ received by the lock-up clutch control valve and a pressure difference $\Delta P$ of engaging and releasing oil chambers of the lock-up clutch.

The graph of FIG. 7 indicates a change of the pressure difference ΔP with the SLIP CONTROL pilot pressure $P_{SLU}$ as a result of an operation of the lock-up clutch slip control valve 86. When the lock-up relay valve 84 is placed in the ON state, the pressure difference $\Delta P =P_{on}-P_{off}$ increases with an increase in the pilot pressure $P_{SLU}$, so that the slip speed $N_{SLIP}$ of the lock-up clutch 32 decreases with the increase in the pilot pressure $P_{SLU}$. In other words, the pressure difference ΔP decreases and the slip speed $N_{SLIP}$ increases as the pilot pressure $P_{SLU}$ is lowered.

Figure 8:
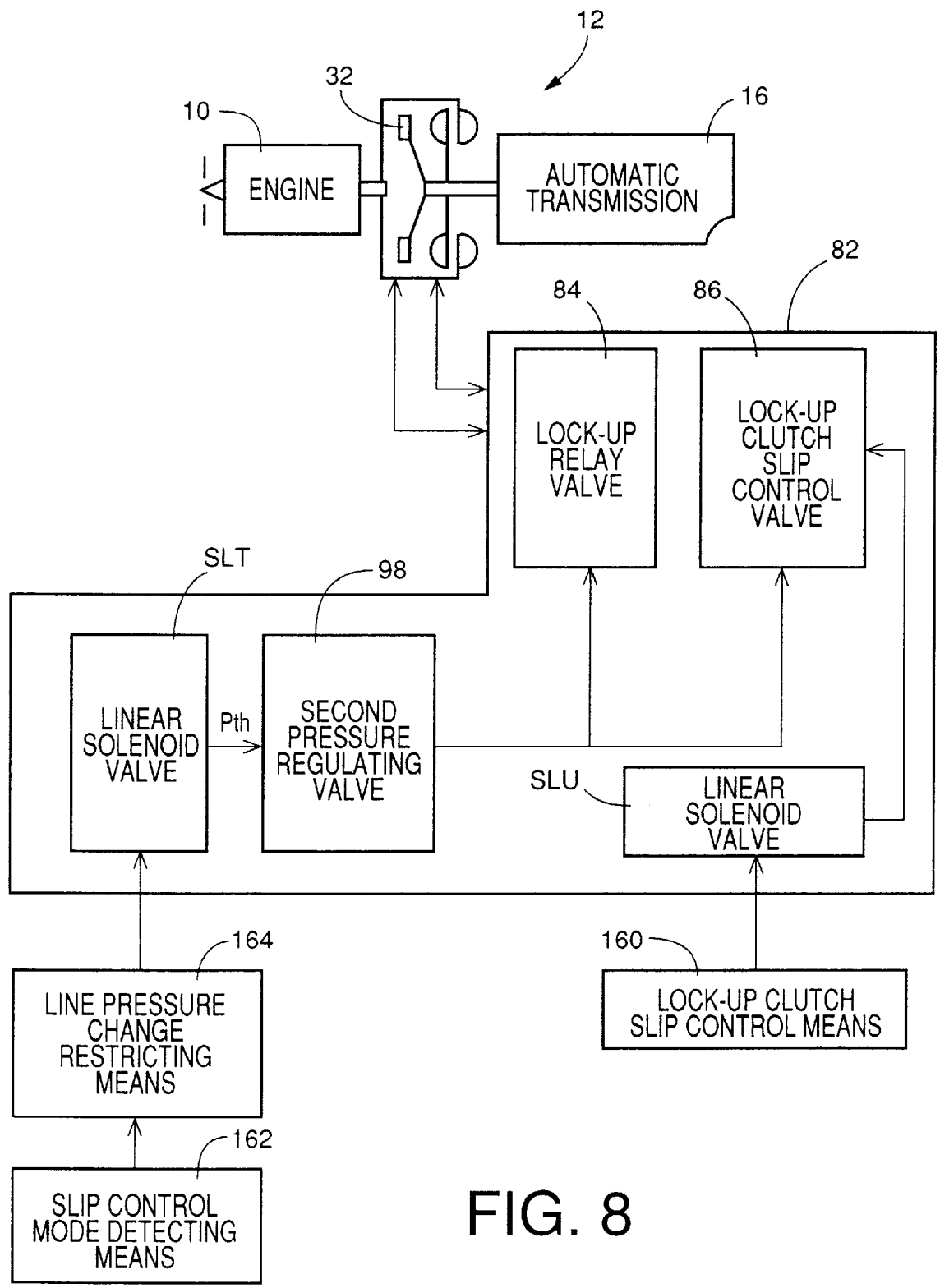
FIG. 8 is a block diagram illustrating the functions of various functional means of a lock-up clutch control apparatus which is incorporated in the transmission controller of FIG. 3 and which includes lock-up clutch slip control means.
Figure 9:
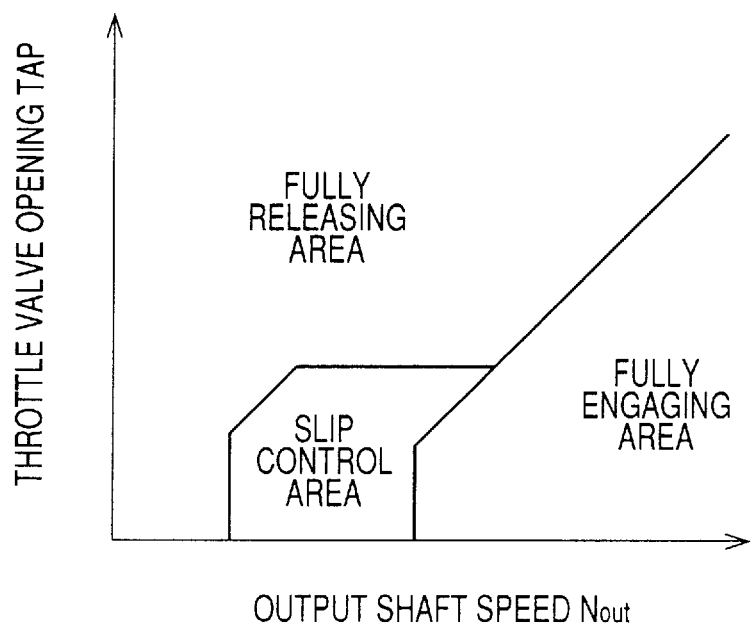
FIG. 9 is a view indicating boundaries defining different control areas of the lock-up clutch in relation to the running condition of the vehicle, the control areas including a slip control area in which the lock-up clutch slip control means is operated.

Referring to the block diagram of FIG. 8, there are illustrated various functional means of the transmission controller 78, which include lock-up clutch slip control means 160, slip control mode detecting means 162 and line pressure change restricting means 164. The lock-up slip control means 160 is operated when the vehicle running condition is in a slip control area as indicated in FIG. 9. Described in detail, the vehicle running condition is represented by the detected throttle opening angle θ and the detected output shaft speed $N_{OUT}$ of the automatic transmission 14 (which represents the vehicle running speed V). For controlling the lock-up clutch 32 differently depending upon the running condition of the vehicle, predetermined boundaries are defining three different control areas as indicated in FIG. 9 are stored in the ROM 79 of the automatic transmission 78. The boundaries are relationships between the throttle opening angle θ and the speed $N_{OUT}$ of the output shaft 40 of the automatic transmission 14. These boundaries define a fully releasing area in which the lock-up clutch 32 should be fully released, a fully engaging area in which the lock-up clutch 32 should be fully engaged, and the above-indicated slip control area in which the amount of slip of the lock-up clutch 32 should be suitably controlled by the lock-up clutch slip control valve 86 through the linear solenoid valve SLU. Depending upon the currently detected throttle opening angle θ and output speed $N_{OUT}$, one of the three control areas is determined by the transmission controller 78 according to the boundaries stored in the ROM 79.

When the vehicle running condition falls in the slip control area of FIG. 9, the transmission controller 78 is placed in a slip control mode in which the lock-up slip control means 160 is activated to control the linear solenoid valve SLU so as to control the SLIP CONTROL pilot pressure $P_{SLU}$ according to a feedback control equation well known in the art, so that the actual slip amount or speed $N_{SLIP}$ coincides with a target value $N_{SLIP}T$.

The slip control mode detecting means 162 is adapted to detect an operation of the lock-up clutch slip control valve 86 in the slip control mode under the control of the lock-up clutch slip control means 160. This detection may be effected by determining whether the vehicle running condition falls in the slip control area of FIG. 9. Alternatively, the detection may be effected on the basis of the operating state of the linear solenoid valve SLU. The line pressure change restricting means 164 is activated when the operation of the lock-up clutch slip control valve 86 in the slip control mode is detected by the slip control mode detecting means 162. The line pressure change restricting means 164 is adapted to inhibit the operation of the linear solenoid valve SLT, or control the linear solenoid valve SLT so that the THROTTLE pilot pressure $P_{th}$ is held constant. Thus, the line pressure change restricting means 164 inhibits the operation of the second pressure regulating valve 98, for inhibiting a change of the second line pressure $P_{L2}$ with a change in the throttle opening angle θ (representing the engine load). When the line pressure change restricting means 164 is operated, the second line pressure $P_{L2}$ to be applied to the lock-up clutch slip control valve 86 is held at a predetermined constant value.

Figure 10:
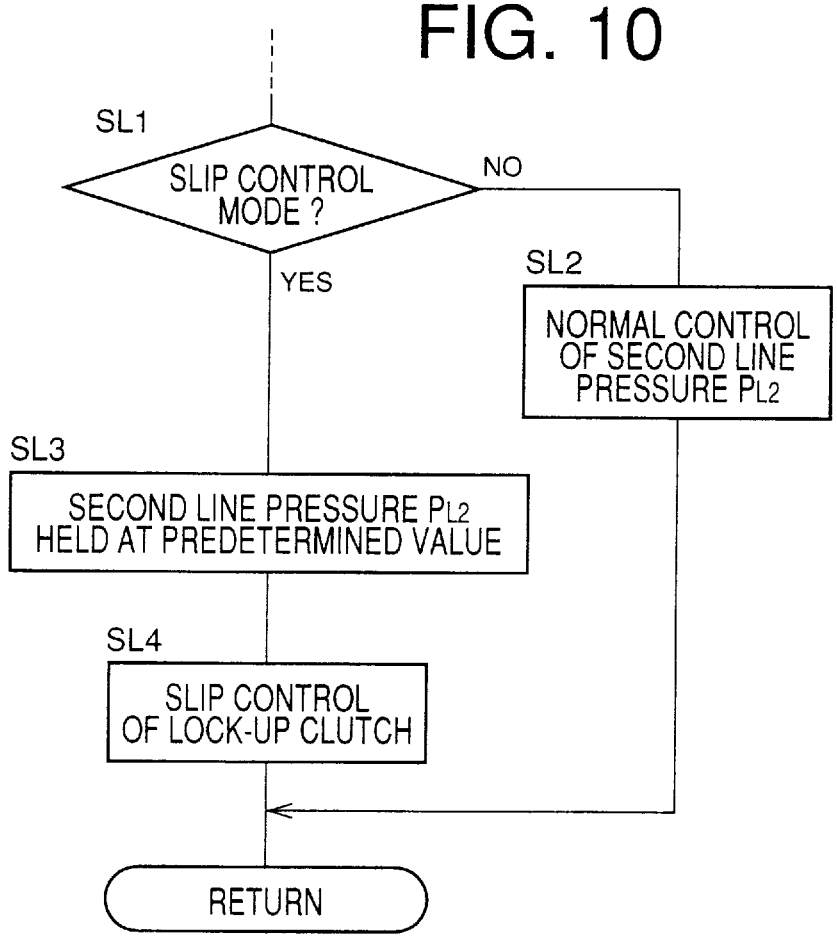
FIG. 10 is a flow chart illustrating a part of a control routine executed by the lock-up clutch control apparatus.

The transmission controller 78 is adapted to execute a control routine a portion of which is illustrated in the flow chart of FIG. 10. Step SL1 in the flow chart of FIG. 10 corresponds to the slip control mode detecting means 162. Namely, step SL1 is provided to determine whether the detected vehicle running condition represented by the throttle opening angle θ and transmission output speed $N_{OUT}$ (vehicle speed V) falls in the slip control area of FIG. 9, that is, whether the lock-up clutch slip control valve 86 is operated in the slip control mode through the linear solenoid valve SLU under the control of the lock-up clutch slip control means 160. If a negative decision (NO) is obtained in step SL1, the control flow goes to step SL2 in which the linear solenoid valve SLT is permitted to operate to apply the pilot pressure $P_{th}$ corresponding to the actual throttle opening angle θ to the second pressure regulating valve 98, whereby the second line pressure $P_{L2}$ is controlled in the normal manner, as indicated by one-dot chain line in FIG. 11. It is noted that the first line pressure $P_{L1}$ is also controlled in the normal manner, as indicated by one-dot chain line in FIG. 11.

Figure 11:
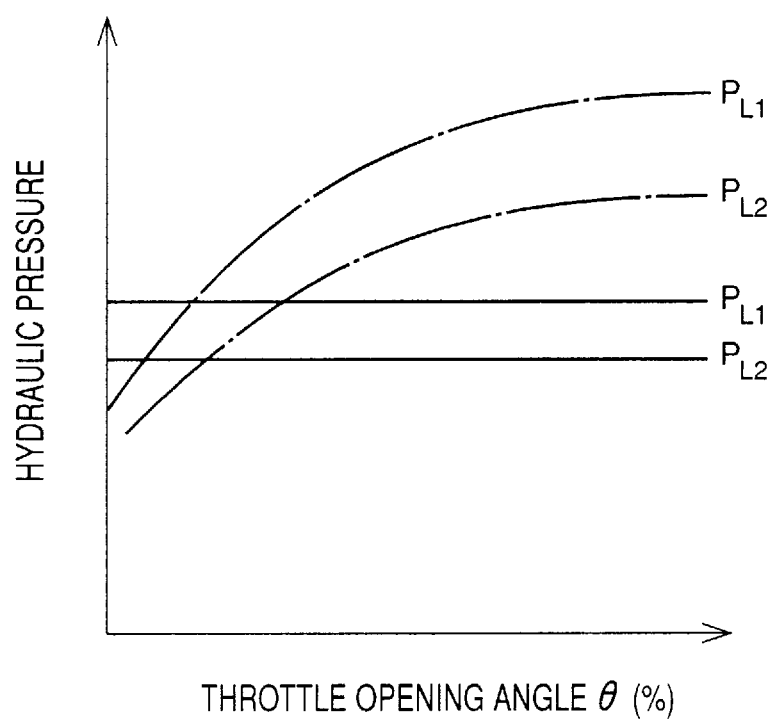
FIG. 11 is a graph indicating first and second lines pressures $P_{L1}$, $P_{L2}$ (solid lines) which are held constant when the lock-up clutch is controlled in a slip control mode by the lock-up clutch slip control means, and these lines pressures $P_{L1}$, $P_{L2}$ (one-dot chain lines) when the lock-up clutch is not controlled in the slip control mode.

If an affirmative decision (YES) is obtained in step SL1, the control flow goes to step SL3 in which the value of the drive signal applied to the linear solenoid valve SLT is held constant, so that the THROTTLE pilot pressure $P_{th}$ generated by the valve SLT and applied to the second pressure regulating valve 98 is held at a predetermined constant value, irrespective of a change in the throttle opening angle θ, whereby the second line pressure $P_{L2}$ is held at a predetermined value, as indicated by solid line in FIG. 11. It is noted that the first line pressure $P_{L1}$ is also held constant, as indicated by solid line in FIG. 11. The predetermined value of the second line pressure $P_{L2}$ is selected to be a value high enough to permit the intended operation of the lock-up clutch slip control valve 86.

Step SL3 is followed by step SL4 corresponding to the lock-up clutch slip control means 160, in which the linear solenoid valve SLU is controlled so that the actual slip speed $N_{SLIP}$ of the lock-up clutch 32 coincides with the predetermined target value $N_{SLIP}T$, for example, a value within a range of about 50–200 r.p.m.

In the present embodiment of the invention, the line pressure change restricting means 164 corresponding to step SL3 is operated to hold the THROTTLE pilot pressure $P_{th}$ at the predetermined constant value irrespective of a change in the throttle opening angle θ when the operation of the lock-up clutch slip control valve 86 under the control of the lock-up clutch slip control means 160 in the slip control mode is detected by the slip control mode detecting means 162 corresponding to step SL1. Thus, the line pressure change restricting means 164 inhibits a change of the second line pressure $P_{L2}$ with a change in the engine load as represented by the throttle opening angle θ, while the lock-up clutch slip control valve 86 is operated in the slip control mode. Accordingly, a change in the engine load during operation of the lock-up clutch slip control valve 86 in the slip control mode will not cause a change in the second line pressure $P_{L2}$ applied to the lock-up clutch slip control valve 86, whereby the hydraulic pressure applied to the lock-up clutch 32 is less likely to be affected by the change in the engine load, leading to improved accuracy of control of the slip amount $N_{SLIP}$ of the lock-up clutch 32. That is, the slip amount $N_{SLIP}$ can be controlled so as to coincide with the target value $N_{SLIP}T$ with improved accuracy.

While the presently preferred embodiment of this invention has been described in detail by reference to the accompanying drawings, it is to be understood that the invention may be otherwise embodied.

Although the line pressure change restricting means 164 is adapted to inhibit a change in the second line pressure $P_{L2}$ by holding the pilot pressure $P_{th}$ at the predetermined constant value irrespective of a change in the actual throttle opening angle θ, the line pressure change restricting means 164 may be adapted to restrict a change in the second line pressure $P_{L2}$ by reducing the ratio of the amount of change of the pilot pressure $P_{th}$ to the amount of change in the throttle opening angle θ. In essence, the line pressure change restricting means 164 may meet the principle of this invention, as long as the means 164 is arranged to reduce an adverse influence of the change of the engine load on the second line pressure $P_{L2}$ which is applied to the lock-up clutch slip control valve 86.

In the illustrated embodiment, the line pressure change restricting means 164 is adapted to hold constant the value of the drive signal applied to the linear solenoid valve SLT to hold the output (throttle pressure $P_{th}$) of the valve SLT. However, the line pressure change restricting means 164 may act on a switching valve provided for selective application of the THROTTLE pilot pressure $P_{th}$ or the third line pressure $P_{L3}$ (output pressure of the third pressure regulating valve 106) to the oil chamber 104 of the second pressure regulating valve 98. Described more specifically, the line pressure change restricting means 164 may be arranged to control the switching valve to apply the third line pressure $P_{L3}$ the oil chamber 104 when the operation of the lock-up clutch slip control valve 86 in the slip control mode is detected by the slip, control mode detecting means 160. In this case, the third line pressure $P_{L3}$ rather than the pilot pressure $P_{th}$ is applied to the lock-up clutch slip control valve 86 when the amount of slip $N_{SLIP}$ of the lock-up clutch 32 is controlled by the lock-up clutch slip control valve 86 in the slip control mode (while the vehicle running condition in the slip control area of FIG. 9).

It is to be understood that the present invention may be embodied with various other changes, modifications and improvements, which may occur to those skilled in the art, without departing from the spirit and scope of the invention defined in the following claims:

What is claimed is:

1. An apparatus for controlling the amount of slip of a lock-up clutch which is provided in a fluid-operated power transmitting device disposed between an engine and an automatic transmission of an automotive vehicle, for direct connection of the engine and the automatic transmission, said apparatus comprising:

a pressure regulating valve for regulating a line pressure depending upon a load acting on said engine;

a lock-up clutch slip control valve operable in a slip control mode, for receiving said line pressure regulated by said the pressure regulating valve, and regulating a hydraulic pressure applied to said lock-up clutch to control the amount of slip of the lock-up clutch;

slip control mode detecting means for detecting an operation of said lock-up clutch slip control valve in said slip control mode; and line pressure change restricting means, responsive to said slip control mode detecting means, for restricting an operation of said pressure regulating valve to restrict a change of said line pressure with a change in said load of the engine, while said lock-up clutch slip control valve is operated in said slip control mode.

2. An apparatus according to claim 1, wherein said fluid-operated power transmitting device includes a torque converter disposed between said engine and said automatic transmission.

3. An apparatus according to claim 1, further comprising a linear solenoid valve which is electrically controlled so as to provide a pilot pressure which changes with a change in said load of said engine, and wherein said pressure regulating valve receives said pilot pressure, said line pressure change restricting means holding said pilot pressure at a predetermined constant value to thereby inhibit the change in said line pressure regulated by said pressure regulating valve while said lock-up clutch slip control valve is operated in said slip control mode.

4. An apparatus according to claim 1, further comprising a linear solenoid valve which is electrically controlled so as to provide a pilot pressure applied to said lock-up clutch slip control valve such that said line pressure received from said pressure regulating valve is controlled by said lock-up clutch slip control valve into said hydraulic pressure applied to said lock-up clutch, on the basis of said pilot pressure received from said linear solenoid valve.

5. An apparatus according to claim 1, wherein said slip control mode detecting means determines whether a running condition of the automotive vehicle falls in a predetermined slip control area, said slip control mode detecting means detecting an operation of said lock-up clutch slip control valve in said slip control mode, if said running condition falls in said predetermined slip control area.

6. An apparatus according to claim 5, wherein said running condition of the automotive vehicle is represented by a running speed of the automotive vehicle and a currently detected load acting on the engine.

7. An apparatus according to claim 1, wherein said lock-up clutch 32 has a piston which partially defining a releasing oil chamber and an engaging oil chamber, and said lock-up clutch slip control valve includes a first position for increasing a pressure difference between pressures in said releasing and engaging oil chambers, and a second position for reducing said pressure difference, said lock-up clutch slip control valve regulating said pressure difference as said hydraulic pressure applied to said lock-up clutch to control the amount of slip of the lock-up clutch.

\* \* \* \* \*